(12) United States Patent  
Niehoff (10) Patent No.: US 9,153,952 B2
(45) Date of Patent: Oct. 6, 2015

(54) RESIDUAL-CURRENT CIRCUIT BREAKER (75) Inventor: Ronaldus Niehoff, Oldenzaal (NL)

(73) Assignee: EATON INDUSTRIES (AUSTRIA) GMBH, Schrems (AT)

( * ) Notice: Subject to any disclaimer, the term of this patent is extended or adjusted under 35 U.S.C. 154(b) by 101 days.

(21) Appl. No.: 13/985,064

(22) PCT Filed: Feb. 16, 2012

(86) PCT No.: PCT/AT2012/000031
§ 371 (c)(1), (2), (4) Date: Aug. 13, 2013

(87) PCT Pub. No.: WO2012/109684
PCT Pub. Date: Aug. 23, 2012

(65) Prior Publication Data
US 2013/0321965 A1 Dec. 5, 2013

(30) Foreign Application Priority Data

Feb. 16, 2011 (AT) .................. A 203/2011
Dec. 14, 2011 (AT) ................. A 1832/2011

(51) Int. Cl.
*H01H 71/44* (2006.01)
*H02H 3/093* (2006.01)
*H01H 83/22* (2006.01)
*H02H 3/33* (2006.01)

(52) U.S. Cl.
CPC ............... *H02H 3/093* (2013.01); *H01H 71/44* (2013.01); *H01H 83/226* (2013.01); *H02H 3/33* (2013.01)

(58) Field of Classification Search
USPC .................................................. 361/42, 143
See application file for complete search history.

(56) References Cited

U.S. PATENT DOCUMENTS

| | | | | |
|---|---|---|---|---|
| 3,898,531 A | * | 8/1975 | Hinman, Jr. | 361/84 |
| 2005/0030684 A1 | * | 2/2005 | Brandonisio | 361/42 |
| 2006/0158798 A1 | * | 7/2006 | Jackson et al. | 361/42 |
| 2010/0134222 A1 | * | 6/2010 | Meisel et al. | 335/18 |
| 2010/0175970 A1 | * | 7/2010 | Pieri | 200/238 |
| 2010/0201206 A1 | * | 8/2010 | Chilvers | 307/116 |
| 2010/0308943 A1 | * | 12/2010 | Dobusch | 335/7 |
| 2013/0120091 A1 | * | 5/2013 | Dobusch | 335/18 |

FOREIGN PATENT DOCUMENTS

| | | |
|---|---|---|
| AT | 408044 B | 8/2001 |
| EP | 0285594 A1 | 10/1988 |
| EP | 0524142 A1 | 1/1993 |
| EP | 2164146 A2 | 3/2010 |
| GB | 2258095 A | 1/1993 |

\* cited by examiner

*Primary Examiner* — Thienvu Tran
*Assistant Examiner* — Angela Brooks
(74) *Attorney, Agent, or Firm* — Leydig, Voit & Mayer, Ltd.

(57) ABSTRACT

A residual-current circuit breaker includes switching contacts and at least one residual current detector configured to determine a residual current signal. The residual-current circuit breaker is configured to bring about an opening of the switching contacts upon the detection of a residual current greater than a pre-definable tripping current. A first circuit arrangement is configured to inhibit tripping of the residual-current circuit breaker when a residual current occurs that has a duration that is shorter than half a period of a grid frequency of an associated electrical grid.

17 Claims, 5 Drawing Sheets

RESIDUAL-CURRENT CIRCUIT BREAKER

CROSS REFERENCE TO RELATED APPLICATIONS

This application is a U.S. National Phase application under 35 U.S.C. §371 of International Application No. PCT/AT2012/000031, filed on Feb. 16, 2012, and claims benefit to Austrian Patent Application Nos. AT A 203/2011, filed on Feb. 16, 2011, and AT A 1832/2011, filed on Dec. 14, 2011. The International Application was published in German Aug. 23, 2012, as WO 2012/109684 A1 under PCT Article 21 (2).

FIELD

The invention applies to a residual-current circuit breaker (RCCB).

BACKGROUND

Residual-current circuit breakers are designed and constructed to trip when a residual current of predefined magnitude occurs, and to separate a downstream sub-grid from an upstream power supply grid by opening breaker contacts, thereby protecting persons from dangerous body currents and equipment from fire. However, residual-current circuit breakers, the tripping conditions whereof depend solely on the magnitude or amplitude of an occurring residual current, have the disadvantage that these trip even with very briefly occurring currents greater than a tripping residual current of the pertinent residual-current circuit breaker, which do not constitute a hazard for persons or equipment, whereby downstream technical installations are unnecessarily disconnected. Not only can costs be thereby incurred due to reduced grid availability, but technical processes can also be compromised.

Residual-current circuit breakers with a so-called G-characteristic or F-characteristic provide considerable help with the aforementioned problem. Residual-current circuit breakers of this kind have brief time delays incorporated into their tripping processes, and only trip if the residual current in question exceeds a particular duration. It has been shown, however, that known types of such residual-current circuit breakers nevertheless trip when residual currents amounting to a half-wave in shape and duration, even though such residual current do not present any hazard whatsoever. Thus it still comes down to unnecessary grid disconnections, compromising technical processes and causing repair and maintenance expenses.

SUMMARY

In an embodiment, the present invention provides a residual-current circuit breaker including switching contacts and at least one residual current detector configured to determine a residual current signal. The residual-current circuit breaker is configured to bring about an opening of the switching contacts upon the detection of a residual current greater than a pre-definable tripping current. A first circuit arrangement is configured to inhibit tripping of the residual-current circuit breaker when a residual current occurs that has a duration that is shorter than half a period of a grid frequency of an associated electrical grid.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention is to provide a residual-current circuit breaker of the aforementioned type in which the disadvantages mentioned in the background can be avoided, with which the number of unnecessary grid disconnections and their consequences can be reduced, and the availability of electrical power can be improved.

In an embodiment, the present invention provides a first circuit arrangement configured to inhibit tripping of the residual-current circuit breaker when a residual current occurs that has a duration that is shorter than half a period of a grid frequency of an associated electrical grid.

In this manner, the number of unnecessary grid disconnections can be reduced and the availability of electrical power can be improved. In this manner it can definitely be ensured that, when a residual current occurs with a duration of about half a wave of the grid frequency, no sub-grids connected downstream of the pertinent residual-current circuit breaker in terms of the invention will be disconnected. The stability and the execution of technical processes which are tied to the availability of electrical power can thereby be improved, while still ensuring protection when a genuine fault occurs.

The invention further provides, in an embodiment, a method for operating a residual-current circuit breaker.

Figure 1:
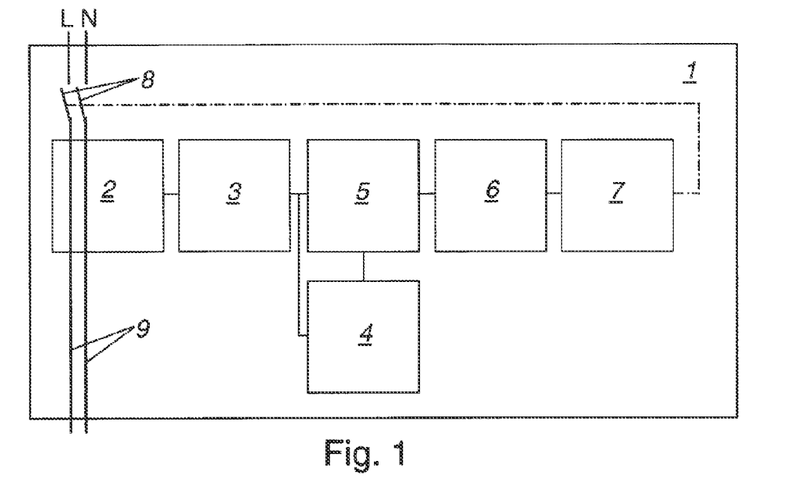
FIG. 1 shows a first preferred embodiment of a residual-current circuit breaker in terms of the invention as a block circuit diagram with a first circuit arrangement.
Figure 7:
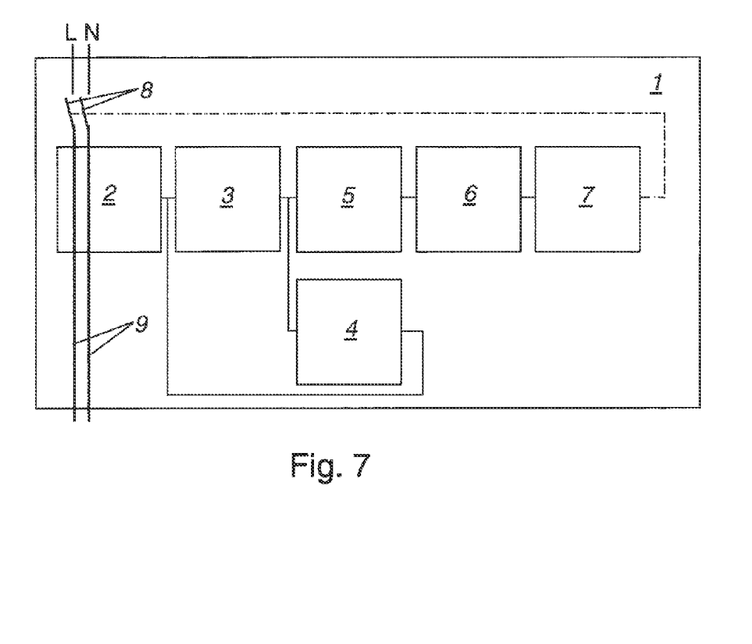
FIG. 7 shows a second preferred embodiment of a residual-current circuit breaker in terms of the invention as a block circuit diagram with a first circuit arrangement.
Figure 9:
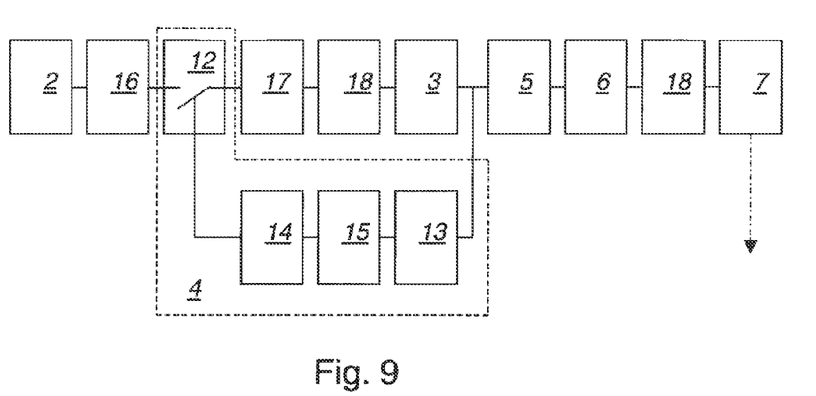
FIG. 9 shows a third preferred embodiment of a residual-current circuit breaker in terms of the invention with a first circuit arrangement.

FIGS. 1, 7 and 9 each show preferred embodiments of a residual-current circuit breaker 1 with switching contacts 8 and at least one residual current detector 2 for detecting a residual current, the residual-current circuit breaker 1 being so constructed as to cause opening of the switching contacts 8 when a residual current occurs that is greater than a pre-definable tripping current, the residual-current circuit breaker 1 having a first circuit arrangement 4, so constructed as to inhibit tripping of the residual-current circuit breaker 1 when a residual current occurs with a duration less than half a period of a grid frequency of an electrical grid.

Due to the construction of the first circuit arrangement 4, the number of unnecessary grid disconnections and their consequences can be reduced, and the availability of electrical power improved. It can thus be definitely ensured that, when a residual current occurs with a duration of about half a wave of the grid frequency, no sub-grids connected downstream of the pertinent residual-current circuit breaker in terms of the invention will be disconnected. The stability and the execution of technical processes which are tied to the availability of electrical power can thereby be improved, while still ensuring protection when a genuine fault occurs. In particular it is provided that the tripping of the pertinent residual-current circuit breaker 1 is only inhibited during the relevant time period.

The residual-current circuit breaker 1 is a switching device, serving as protection against accidental contact with surfaces, with breaks the electrical circuit as soon as a residual current is detected, caused by a fault to frame or other ground fault, at a predetermined level.

Especially preferred—and described in detail in the following—is a residual-current circuit breaker 1 with switching contacts 8 and at least one residual current detector 2 for determining a residual current signal, the residual-current circuit breaker 1 causing the opening of the switching contacts 8 when a residual current greater than a tripping current occurs, the residual-current circuit breaker 1 having a first circuit arrangement 4 with a first switching element 12, the first switching element 12 being connected by circuitry with an energy storage component 5 of a tripping circuit, the first switching arrangement including a first timer which is connected by circuitry with the first switching element 12, the first timer 14 closing the first switching element 12 for only the duration of a first time period upon detecting a residual-current signal of predefined magnitude, and the first switching element 12, when closed, connecting an output of the energy storage component 5 with an electrical earth, or bridging the energy storage component to earth.

The electrical grid preferably consists of that electrical grid which is monitored by the residual-current circuit breaker for the appearance of residual currents, and which in the event of a fault is disconnected by the residual-current circuit breaker.

In order to break the electrical circuit, a residual-current circuit breaker 1 has switching contacts 8 which, in the event of a residual current deemed hazardous, break the electrical circuit by opening the switching contacts 8.

The process by which the residual-current circuit breaker breaks the electrical circuit is hereinafter called the tripping of the residual-current circuit breaker 1.

In order to detect the residual current, a residual-current circuit breaker 1 has at least one residual current detector 2. In the process, the residual current detector 2 monitors the electrical lines 9, which connect a downstream sub-grid with an upstream power supply grid. The residual current detector 2 can be constructed in various ways.

It has proven especially advantageous to construct the residual current detector 2 as a current transducer or as a summation current transformer. In other possible embodiments, the residual current detector 2 can be constructed as a fluxgate magnetometer or as a shunt resistor or combinations of the abovementioned embodiments.

The residual current detector 2 transduces the residual current, which is the difference between the inflowing and outflowing electrical current, into an error signal.

In the figures, preferred embodiments of the concrete invention are illustrated as block circuit diagrams. The connecting lines between the individual blocks thus do not necessarily represent a single electrical connection, but rather represent the sum of all necessary circuitry connections between two blocks, which need not necessarily be only electrical.

In FIG. 1, a first technical embodiment of the residual-current circuit breaker 1 is shown as a block circuit diagram.

The preferred embodiment has a residual current detector 2, which converts the residual current into a residual current signal. Here, the residual current detector 2 is preferably constructed as a summation current transformer, which includes a transformer core, at least one primary winding, which usually consists of the lines of the electrical grid to be protected, and at least one secondary winding. The preferred embodiment of the residual current circuit breaker 1 has a rectifier 3 which rectifies the residual current signal.

In this preferred embodiment, the residual current signal is accumulated in an energy storage component 5, in particular in at least one capacitor 11. Thus the residual-current circuit breaker 1 can draw the energy required for tripping from the residual current signal.

In an especially preferred embodiment, the energy storage component 5 can be constructed as a low-pass filter or as a part of a low-pass filter.

The preferred embodiment has a comparator 6 which suitably compares the state of charge of the energy storage component 5 with a predetermined value, the value corresponding to a tripping residual current of the respective residual current circuit breaker 1. The tripping residual current is usually smaller than a nominal residual current of a particular type of residual current circuit breaker 1. Thus for example the actual tripping residual current of a residual-current circuit breaker 1 can preferably, at a nominal residual current of 30 mA, be 75% of the nominal residual current and amount to 22.5 mA. The actual amplitude or magnitude of the tripping residual current of the residual-current circuit breaker 1 can be approximately influenced or determined by an amplification factor of the rectifier 3 or of the comparator 6.

The preferred embodiment of the residual-current circuit breaker 1 also has an actuator 7. The input of the actuator 7 is connected by circuitry with the output of the comparator 6. The actuator 7 operates the switching contacts 8 and thereby breaks the circuit when it is triggered by the comparator 6.

It is provided that a residual-current circuit breaker 1 has a first circuit arrangement 4 which is so constructed as to inhibit or to prevent or to impede tripping of the residual-current circuit breaker 1 when a residual current occurs with a maximum duration of a half-period of the grid frequency of an electrical grid to be protected.

Thus the pertinent residual-current circuit breaker 1 has, in other words, a first circuit arrangement 4 for inhibiting the tripping of the residual-current circuit breaker 1 when a residual current occurs having a maximum duration of one half-period of the grid frequency of an electrical grid.

A reduction of unnecessary grid disconnections can thereby be attained, in that short-duration residual currents, which usually have no effect on persons, do not lead to tripping of the residual-current circuit breaker 1. In particular, residual currents occur which constitute a singular event and are extinguished with a zero-crossing of the grid voltage or the grid current. Thus it is especially preferred to provide that the first circuit arrangement 4, upon occurrence of a residual current with a maximum duration of a half-period of the grid frequency of the electrical network to be protected, inhibits tripping of the residual-current circuit breaker 1. This is not ensured by conventional short-delay residual-current circuit breakers 1.

The half-period of the grid frequency for the most frequently used supply grids amounts to 10 ms for the grid frequency of 50 Hz used e.g. in Europe, 8.3 ms for the grid frequency of 60 Hz used e.g. in North America, and 29.9 ms for the railway power supply grid in central Europe, which has a grid frequency of 16.7 Hz. The half-period of the grid frequency of an electrical grid to be protected is hereinafter called the half-period.

The expression "of a duration shorter than a half-period" thus preferably designates residual currents with a duration of up to a half-period, preferably including the exact value of the half-period.

It is preferably provided that a residual-current circuit breaker 1 in terms of the invention is set to the standardised or statutorily determined grid frequency. It can be provided, particularly in areas with high grid frequency fluctuations, for example undeveloped areas to set or design a residual-current circuit breaker 1 in terms of the invention to a grid frequency corresponding in terms of experience to a maximum network frequency occurring in the region.

A first preferred embodiment of a residual-current circuit breaker 1 will be described hereinafter. Subsequently, other preferred embodiments will be described.

The first preferred embodiment of the residual-current circuit breaker 1 according to FIG. 1 has such a first circuit arrangement 4 which is constructed for deactivating and/or disabling a tripping circuit of the residual-current circuit breaker 1 during a first time period.

By deactivation and/or disabling of a tripping circuit is meant that the separation of the switching contacts 8 and the consequent interruption of the circuit of the electrical grid to be monitored is prevented. This can be attained by many different preferred embodiments, which will be illustrated hereinafter.

It has become apparent that, particularly in the preferred construction of the residual current detector 2 as a summation current transformer, electrical energy of the residual current can be stored in electrical components, such as parts of the summation current transformer 2, which is released after extinguishing of a short-duration residual current and which is sufficient to trigger a conventional residual current circuit breaker 1. It therefore appeared especially advantageous for attaining the desired effect if the first circuit arrangement 4 inhibited the tripping of the residual-current circuit breaker, when a short-duration residual current occurred, for a longer time than the actual duration of the occurrence of the respective residual current.

It is therefore preferably provided that the first time period amount to 75%, particularly 60%, preferably at least 50% of the period length of the electrical grid to be protected. At a grid frequency of 50 Hz, the first time period, during which the tripping of the residual-current circuit breaker is inhibited, is particularly 15 ms, preferably 12 ms and at least 10 ms. In this connection it is particularly provided that the first time period amounts at most to the time periods mentioned above. In this connection it is particularly provided, that the tripping of the residual-current circuit breaker is only inhibited during this period.

In a residual-current circuit breaker 1 in terms of the invention, it is provided that when a short-duration residual current, of shorter duration than a half-period of the electrical grid to be protected, occurs or is detected, the tripping of the residual-current circuit breaker 1 will be inhibited for at least the duration of the actual occurrence of the short-duration residual current, it being particularly provided to inhibit tripping for an additional time period. Here the additional time period prevents the possible delayed tripping of the residual-current circuit breaker 1 due to stored energy, which is caused by the short-duration residual current. The full time period during which the tripping of the residual-current circuit breaker 1 is preferably inhibited is then in preferred embodiments—neglecting the switching times of the electrical components employed—the first time period.

In the first preferred embodiment shown in FIG. 1, the input of the first circuit arrangement 4 is connected through circuitry with the output of the rectifier 3.

In this preferred embodiment, the first circuit arrangement 4 is connected though circuitry with the energy storage component 5 so as to inhibit tripping of the residual-current circuit breaker 1. This can occur e.g. by the first circuit arrangement 4 discharging the energy storage component 5, or preventing further charging of the energy storage component 5. During the first time period, the energy storage component 5 is not further charged.

Another possible embodiment of the invention, not shown, can consist in that the first circuit arrangement 4 is connected through circuitry with the comparator 6 or the actuator 7, in order to inhibit tripping of the residual-current circuit breaker 1, e.g by means of mechanical blocking of the tripping mechanism.

Figure 2:
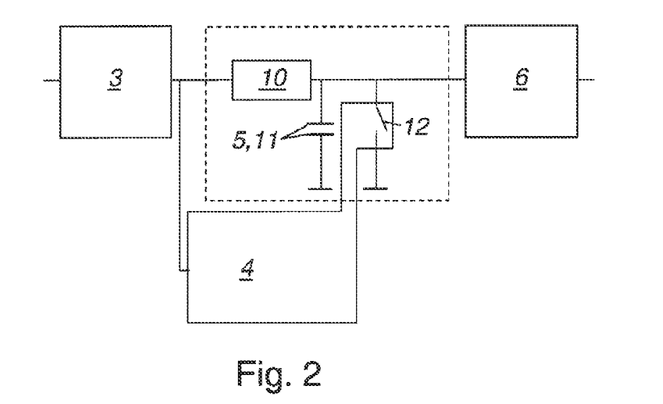
FIG. 2 shows sub-assemblies of the residual-current circuit breaker according to FIG. 1 with a first preferred embodiment of the first circuit arrangement as a block circuit diagram.

In the first preferred embodiment according to FIG. 2, the residual-current circuit breaker 1 is so constructed that the first circuit arrangement 4 is constructed for discharging an energy storage component 5 of the tripping circuit during the first time period following detection of a residual current of predefinable magnitude, particularly after detecting a residual current greater than the tripping residual current.

In the first preferred embodiment, the first switching arrangement 4 includes a first switching element 12, which is connected through circuitry with the energy storage component 5.

The energy storage element in the first preferred embodiment has a capacitor 11 and an electrical resistor 10, which serves as a charging resistance for the capacitor.

In the first preferred embodiment, the first switching element 12 is constructed as a semiconductor switch, particularly as a barrier-layer field-effect transistor, as a smaller component cost can thereby be attained. What is more, a semiconductor switch is less fault-prone than a mechanical switch and allows low-power control.

The first preferred embodiment has a switching element 12, which when closed connects an output of the energy storage component 5 with an electrical earth.

In the first preferred embodiment, in the event of a residual current the first switching element 4 will discharge the capacitor 11 of the energy storage component 5 for the first time period and thereby prevent tripping of the residual-current circuit breaker, in the event that the residual current does not persists longer than a half-period.

Figure 3:
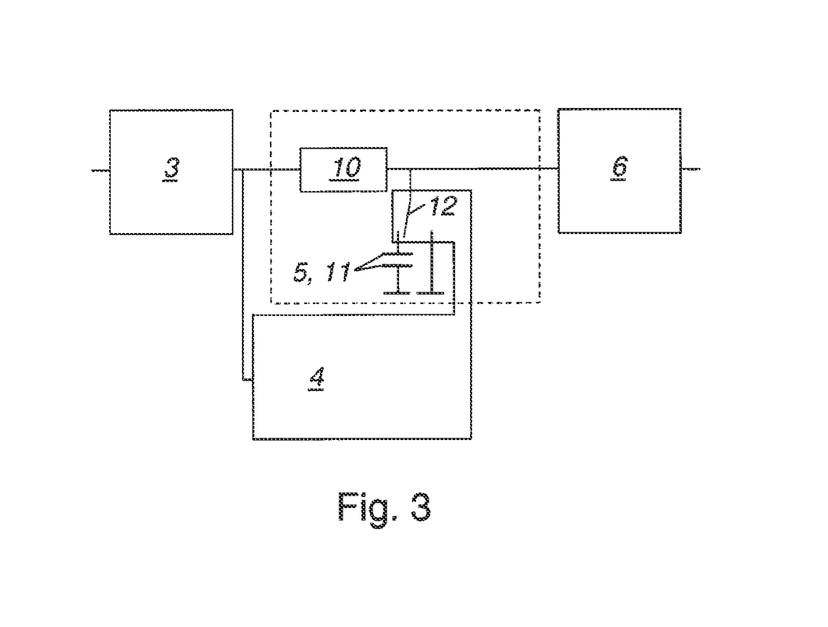
FIG. 3 shows sub-assemblies of the residual-current circuit breaker according to FIG. 1 with a second preferred embodiment of the first circuit arrangement as a block circuit diagram.

In the second preferred embodiment according to FIG. 3, the residual-current circuit breaker 1 is so constructed that the first circuit arrangement 4 prevents further charging of an energy storage component 5 of the tripping circuit during the first time period following detection of a residual current of predefinable magnitude, particularly following detection of a residual current greater than the tripping residual current.

The second preferred embodiment also has a first switching element 12, which can be constructed just as in the first preferred embodiment.

The first switching element 12 is positioned in the second preferred embodiment as a two-way make contact ahead of the capacitor 11. In a first switching condition of the first switching element 12, the first switching element 12 is connected to the capacitor 11, whereby it can be charged by the residual current signal. In the second switching condition of the first switching element 12, the first switching element releases the connection with the capacitor and switches to a second contact which is connected to earth, whereby the residual current signal is conducted to and electrical earth.

As a result, in the second switching state of the first switching element 12, the capacitor 11 is not discharged, but rather bypassed. The energy storage component 5 is then bypassed to ground. As a result, the capacitor 11 is not discharged if a high residual current of short duration occurs, but rather retains whatever charge state it had prior to the occurrence of the short-duration residual current. During the first time period, the residual current signal is conducted past the capacitor to earth. This makes it possible for the residual-current circuit breaker to also react to a relevant electrical fault, while a short-duration residual current signal occurring in the meantime is filtered out and does not cause any premature and functionally unfounded tripping.

Figure 4:
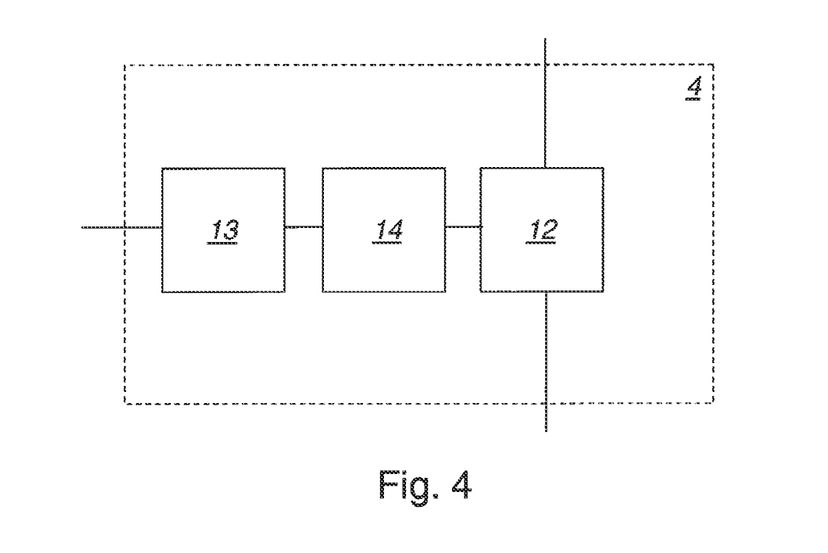
FIG. 4 shows a third preferred embodiment of the first circuit arrangement as a block circuit diagram.

A third preferred embodiment of the first circuit arrangement 4 is shown in FIG. 4.

D The first circuit arrangement 4 includes in this possible embodiment a second circuit arrangement 13, for comparing the residual current signal with a pre-definable value which represents the tripping residual current. This value can also be called a limiting value. It is thereby ensured that the first circuit arrangement 4 is only triggered in the event of a residual current higher than the tripping residual current.

Moreover, the first circuit arrangement 4 in the third preferred embodiment according to FIG. 4 includes a first switching element 12 which is preferably constructed according to both of the previously described first and/or second preferred embodiments.

In the third preferred embodiment, the first switching arrangement 4 has a first timer 14 for controlling the first switching element 12 during the first time period.

The first timer 14 preferably closes the first switching element 12 upon detection of a residual current signal of pre-definable magnitude, solely for the duration of the first time period.

According to a further preferred embodiment of the concrete invention, it is provided that the duration of the first time period can be altered in a predefined fashion. In particular, it is provided in this connection that the first time period can be directly entered in a residual-current circuit breaker 1 in terms of the invention. In this connection it can be provided that a suitably constructed residual-current circuit breaker 1 has an accessible control element, by means of which either the first time period can be entered directly and/or by means of which it is perhaps possible to switch between grid frequencies, such as from 50 Hz to 60 Hz. The pertinent residual-current circuit breaker can thereby be adjusted to various application environments. It can also be provided that a corresponding residual-current circuit breaker 1 has a buss interface, and the first time interval can be set via the buss interface under computer control.

The first timer 14 is then constructed as an electronic switch, particularly including flip-flops. In this manner, a lower component cost can advantageously be achieved. In this predefined time period, the first timer 14 provides an output signal.

In the third preferred embodiment shown in FIG. 4, the output of the second circuit arrangement 13 is connected by circuitry with the input of the first timer 14. The input of the timer 14 can with special preference be edge-controlled. Here edge-controlled means that the first timer 14 is activated by a rising edge of the input signal.

By the expression "activation" of a first or second timer 14, 15 is preferably meant, for the purpose of the concrete invention, that the output signal of the first timer 14 and/or of the second timer 15 changes its current state in a pre-definable manner, and particularly that the output signal is set from "Low" to "High."

In the third preferred embodiment shown in FIG. 4, the output of the first timer 14 is connected by circuitry with the input of the first switching element 12. It can thereby be achieved that in the event of a residual current signal that is greater than the predefined value of the second circuit arrangement 13, the first timer 14 is started and the first switching element 12 is closed for the duration of the first time period. Unnecessary tripping of the circuit breaker can thereby be prevented.

In a further embodiment of the invention, it can be provided that the first circuit arrangement 4 includes a second timer 15, for deactivating the first timer 14 during a second time period consecutive to the first time period. The first timer 14 is thereby prevented from repeatedly preventing tripping of the residual-current circuit breaker 1 in the event of consecutive short-duration residual currents at short intervals, as in this case tripping of the residual-current circuit breaker 1 would be desirable, as such residual currents can have negative effects on persons.

In further development of the invention, one output of the second circuit arrangement 13 can be connected by circuitry to the input of the first timer 14 and/or of the second timer 15. The first timer 14 and/or the second timer 15 is thereby activated after detection of a residual current signal which is greater than the predefined value of the second circuit arrangement 13. The second circuit arrangement 13 is then possibly constructed as a comparator circuit.

In a further development of the invention, the output of the second timer 15 can be connected by circuitry with the input of the first timer 14. The first timer 14 can thereby be activated or deactivated by the second timer 15.

Figure 5:
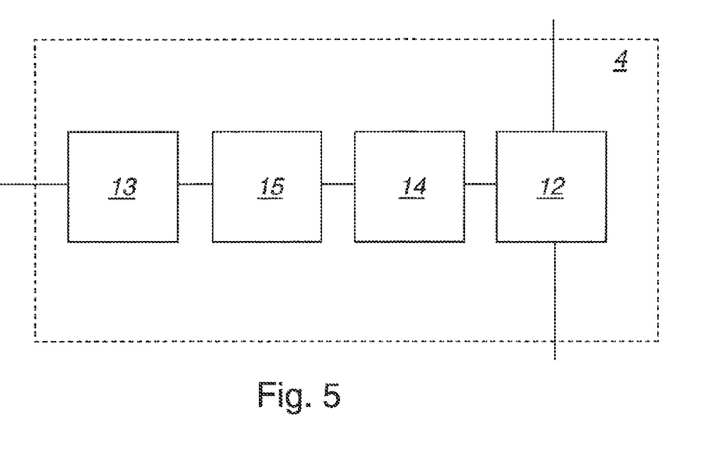
FIG. 5 shows a fifth preferred embodiment of the first circuit arrangement as a block circuit diagram.
Figure 6:
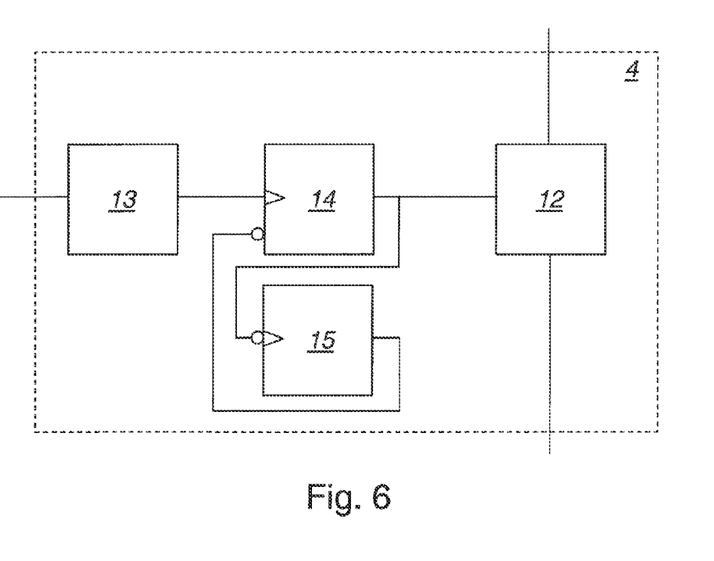
FIG. 6 shows a fifth preferred embodiment of the first circuit arrangement as a block circuit diagram.

Two possible preferred technical embodiments of the first circuit arrangement 4 are shown in FIG. 5 and FIG. 6.

Here the second time period is longer than the first time period to prevent consecutive activation of the first timer 14.

The second time period is preferably as long as the tripping time of the residual-current circuit breaker 1 when a residual current of the magnitude or amplitude of the tripping residual current occurs. It can thereby be ensured that a residual current occurring consecutive to or in parallel with a short-duration or singular residual current event can also actually bring about tripping of the residual-current circuit breaker 1, provided that such tripping is required for safety reasons. The specific length of the second time period is consequently dependent on the respective nominal or tripping residual current of a residual-current circuit breaker 1.

The second timer 15 is then also constructed as an electronic switch, including with special preference flip-flops. A lower component cost can thereby be advantageously achieved. In this second time period, the second timer 15 emits a constant-level signal at its output.

FIG. 5 shows the fourth preferred embodiment of the first circuit arrangement 4, wherein the output of the second switching element 13 is connected by circuitry with the input of the second timer 15, the output whereof is in turn connected by circuitry with the input of the first timer 14, which in turn controls the first switching element 12. Here the inputs of the first timer 14 and of the second timer 15 are with special preference edge-controlled.

If a residual current signal which is greater than the predefined value of the second circuit arrangement 13 is present at the input of the second circuit arrangement 13, the second timer 15 is activated, which then emits a signal at its output. As the first timer 14 is connected by circuitry with the output of the second timer 15, the latter is thereby activated. As the first timer 14 is edge-controlled, it is only activated upon activation of the second timer 15. Continuing into the second time period, the first timer 14 can no longer be activated, as the constant signal from the second timer 2 is present at its input irrespective of what residual-current signals are occurring.

FIG. 6 shows a fifth preferred embodiment of the first circuit arrangement 4 wherein the first timer 14 has two inputs. The output of the second circuit arrangement 13 is connected by circuitry with the input of the first timer 14, which controls the first switching element 12. Furthermore, the output of the first timer 14 is connected with the inverted, edge-controlled input of the second timer 15, the output whereof is in turn connected by circuitry with a dominant inverted status-controlled input of the first timer 14.

If in the fifth preferred embodiment a residual current signal is present at the input of the second circuit arrangement 13 which is greater than the predefined value of the second circuit arrangement 13, the first timer 14 is activated, which then emits a signal at its output. At the end of the first time period, the second timer 15 is then activated, as this is connected by inverted edge control with the output of the first timer 14. Inverted edge control means that the activation of the second timer 15 occurs at the falling edge of the signal from the first timer 14. As the output of the second timer 15 is connected through circuitry with a dominant reset input of the first timer 14, the second timer 15 suppresses repeated activation of the second timer 14 for the duration of the second time period.

A sixth preferred embodiment, which is considered especially advantageous, has the features of the first and the fourth preferred embodiments, which are shown in FIG. 1, FIG. 2 and FIG. 5.

The sixth preferred embodiment includes a residual current detector 2, which converts the residual current into a residual current signal, an amplifier, which actively amplifies the residual current signal, a rectifier 3 for rectifying the residual current signal, an energy storage component 5, a comparator 6, which compares the charge state of the energy storage component 5 with a predefined value, a second amplifier, which amplifies the signal of the comparator 6, and an actuator 7, which drives the switching contacts 8 and can thus interrupt the electric lines 9.

The sixth preferred embodiment has a first circuit arrangement 4, the input whereof is connected by circuitry with the output of the rectifier 3.

The first circuit arrangement 4 has a second circuit arrangement 13, the input whereof is connected to the output of the rectifier 3 and the output whereof is connected by circuitry with the input of a second timer 15, the output whereof is in turn connected through circuitry with the input of a first timer 14, which in turn controls the first switching element 12, which in its closed state connects an output of the energy storage component 5 with an electrical earth.

The residual-current circuit breaker 1 is thereby prevented from tripping in the event of a residual current which is shorter than half a period. Moreover, the second timer 15 in the first circuit arrangement 4 prevents the first timer 14 from repeatedly preventing tripping of the residual-current circuit breaker in the case of consecutive short-duration residual currents at brief intervals.

A method for operation the above residual-current circuit breaker 1 is described hereafter.

A residual current occurring in an electrical grid to be monitored is detected by the residual current detector 2, the residual current being converted into a residual current signal.

It is preferably provided that the residual current signal is amplified.

Moreover, the residual current signal is also rectified.

Subsequently, an energy storage component 5 is charged by the residual current signal.

Thereafter, the charge state of the energy storage component 5 is compared with a predefined values in the comparator 6, which represents the tripping residual current.

If the charge state of the energy storage component 5 is greater than the predefined value of the comparator 6, an actuator 7 is activated, which operates the switching contacts 8 through which the electrical lines 9 of the grid to be monitored are led, the electrical circuit being thereby interrupted.

In this connection it is preferably provided that the signal of the comparator 6 is subsequently actively amplified.

Substantially simultaneously, the rectified residual current signal is compared with a comparison value representing a tripping residual current, tripping of the residual-current circuit breaker 1 being inhibited if the residual current signal is greater than the comparison value.

Advantageously, the residual-current circuit breaker 1 can be prevented from tripping and thereby interrupting the circuit, in the event of a residual current which is greater than the tripping residual current, but of shorter duration than or equal in duration to a half-period of the monitored electrical grid, and therefore non-hazardous. The number of unnecessary grid disconnections and their consequences can thereby be reduced.

Tripping of the residual-current circuit breaker 1 can be inhibited in various ways.

In the first preferred embodiment, the energy storage component 5 can be discharged during the first time period following detection of a residual current.

In a second preferred embodiment the residual current signal can be routed past the energy storage component 5 during the first time period following detection of a residual current. The discharge of the energy storage component 5 can thereby be prevented and the energy storage component 5 maintain the charge state, which the energy storage component 5 had prior to the appearance of the residual current signal.

According to another embodiment of the invention, the comparator 6 and/or the actuator 7 can be inhibited during the first time period.

According to an especially preferred embodiment of the residual-current circuit breaker 1, inhibition of tripping is prevented during a second time period following the first time period.

In one variant of the invention, this can be accomplished by preventing discharge of the energy storage component 5 during a second time period following the first time period. Repeated tripping of the residual-current circuit breaker 1 in the event of consecutive short-duration residual currents at short intervals can thereby be prevented.

The method for operating the sixth embodiment, considered especially advantageous, is described in detail hereafter.

In the sixth preferred embodiment, the residual current is converted in a residual current detector 2 into a residual current signal, the signal is then amplified and rectified by a rectifier 3. Subsequently, an energy storage component 5 is charged by the residual current signal and the charge state of the energy storage component 5 is compared with a predefined value of the comparator 6, which represents the tripping residual current.

If the charge state of the energy storage circuit 5 is greater than the predefined value of the comparator 6, a signal is emitted at the output of the comparator 6 which is subsequently amplified. An actuator 7 is activated by the amplified signal of the comparator, which operates the switching contacts 8 through which the electrical lines 9 of the network to be monitored are led, the electrical circuit being thereby interrupted.

In addition, the residual current signal from the rectifier 3 is compared in a second circuit arrangement 13 with a predefined value which represents the tripping residual current. If the residual current signal exceeds this predefined value, a second timer 15 is activated for the duration of the second time period. A first timer 14 is activated by the second timer 15, whereupon the first timer 14 emits a signal for the first time period. The first timer 14 is then only activated once in the second time period. A first switching element 12 is triggered by the first timer 14 during the first time period, which discharges the energy storage component, as the output of the energy storage component 5 is connected with an electrical earth by the first switching element 12.

FIG. 7 shows a second preferred embodiment of a residual-current circuit breaker 1 in terms of the concrete invention. FIG. 9 shows a third preferred embodiment of a residual-current circuit breaker 1, this being an especially preferred development of the second preferred embodiment. Unless otherwise stated, construction of the individual assemblies, both of the residual-current circuit breaker 1 and of the first circuit arrangement 4, corresponds to the statements made regarding the first preferred embodiment of a residual-current circuit breaker 1.

The second and the third preferred embodiment of a residual-current circuit breaker 1 are distinguished from the first preferred embodiment according to FIG. 1 particularly by the construction of the first circuit arrangement 4, as well as the range in which it affects the remaining assemblies of the respective residual-current circuit breaker 1 in terms of circuitry, and/or how it is connected with them.

Figure 8:
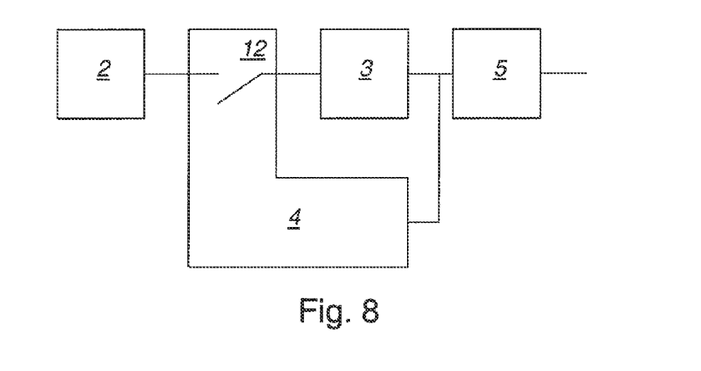
FIG. 8 shows sub-assemblies of the residual-current circuit breaker according to FIG. 7 with a sixth preferred embodiment of the first circuit arrangement as a block circuit diagram; and 7

According to this preferred embodiment according to FIG. 7 through 9, it is provided that the first circuit arrangement 4 is constructed so as to interrupt a connection between the residual-current detector 2 and the tripping circuit during the first time period following detection of a residual current of predefined magnitude. This is indicated in FIG. 7 only by a connection of the first circuit arrangement 4 with the connection between the residual current detector 2 and the rectifier 3. Further charging of an energy storage component 5 can thereby be reliably halted and tripping prevented.

For this purpose it is particularly provided that the first switching element 12 is connected by circuitry with the residual current detector 2. Here it can be provided that the first switching element 12 is constructed as a semiconductor switch as previously described, but a mechanical breaker can also be provided. Due to the short switching times achievable, construction of the first switching element 12 as a semiconductor switch is preferred. Here it is preferably provided that the first switching element 12, in a driven state, breaks an electrical connection between the residual-current detector 2 and the rectifier 3. Here it can also be provide that the connection between the residual current detector 2 and the other tripping circuit, particularly between the residual current detector 2 and the rectifier 3, is not just simply broken, but rather at least one of the two sides is switched to a definite potential, possible to earth. FIG. 8 shows such a preferred embodiment, the remaining details of the first circuit arrangement 4 not being discussed.

FIG. 9 shows an especially preferred third embodiment of a residual-current circuit breaker 1 which will be described in detail:

The residual current detector 2 is constructed as a summation current transformer. This has so-called protective diodes 16 according to the preferred embodiment. These are diodes connected with opposing polarity, which are preferably positioned on an additional winding around the core of the summation current transformer, which can be called a tertiary winding. It can however also be provided that these are positioned on the secondary winding.

The first switching element 12 is positioned in terms of circuitry at the output of the summation current transformer, which provides the residual current signal, possibly following the protective diodes. A definite load resistor 17, also called an output load, is connected to this. Following this is connected an amplifier circuit 18, the output whereof is connected to the rectifier 3, which is connected on the output side both to the first circuit arrangement 4 and to the energy storage circuit or the energy storage component 5.

The energy storage component 5 is, as previously stated, connected to the comparator 6, the output signal whereof is amplified, according to the preferred embodiment, in another amplification circuit 18, and is then conducted to an actuator 7, which bring about the separation of the switching contacts if appropriate.

The first circuit arrangement has—as previously stated—the second circuit arrangement 13, as well as the first and second timers 14, 15, which control the first switching element 12.

With regard to the preferred embodiments of the first circuit arrangement 4, particularly of the first and second timers 14, 15, the combination of every embodiment that was described in connection with the description of the first preferred embodiment of a residual-current circuit breaker 1 is explicitly provided with the other embodiments of a residual-current circuit breaker 1. In particular, the construction of the first circuit arrangement 4 according to FIG. 5 or 6 is provided with the second or third embodiment of a residual-current circuit breaker 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A residual-current circuit breaker comprising:
    switching contacts;
    a residual current detector configured to determine a residual current signal, the residual-current circuit breaker being configured to bring about an opening of the switching contacts upon the detection of a residual current greater than a pre-definable tripping current; and
    a first circuit arrangement configured to inhibit tripping of the residual-current circuit breaker when a residual current occurs that has a duration that is shorter than half a period of a grid frequency of an associated electrical grid,
    wherein the first circuit arrangement includes a first switching element,
    wherein the first circuit arrangement includes a first timer for controlling the first switching element during a first time period, and
    wherein the first circuit arrangement includes a second timer for deactivating the first timer during a second time period immediately following the first time period.

2. The residual-current circuit breaker according to claim 1, wherein the first circuit arrangement is configured so as to deactivate and/or disable a tripping circuit of the residual-current circuit breaker during the first time period.

3. The residual-current circuit breaker according to claim 2, wherein the first time period amounts to at least 50% of the period of the electrical grid to be protected.

4. The residual-current circuit breaker according to claim 2, wherein the first circuit arrangement is configured so as to discharge an energy storage component of the tripping circuit during the first time period following detection of a residual current of predefined magnitude.

5. The residual-current circuit breaker according to claim 2, wherein the first circuit arrangement is configured so as to break a connection between the residual current detector and the tripping circuit during the first time period following detection of a residual current of predefined magnitude.

6. The residual-current circuit breaker according to claim 1, wherein the first circuit arrangement includes a second circuit arrangement configured to compare the residual current signal with a limiting value.

7. The residual-current circuit breaker according to claim 1, wherein the first switching element is connected through circuitry with an energy storage component.

8. The residual-current circuit breaker according to claim 7, wherein the first switching element, in a closed state, connects an output of the energy storage component with an electrical earth.

9. The residual-current circuit breaker according to claim 7, wherein the first switching element, in the closed state, bridges an output of the energy storage component to earth.

10. The residual-current circuit breaker according to claim 1, wherein the first switching element is connected through circuitry with the residual current detector.

11. The residual-current circuit breaker according to claim 1, wherein the first switching element, in a driven state, breaks an electrical connection between the residual current detector and a rectifier.

12. The residual-current circuit breaker according to claim 1, wherein the second time period is longer than the first time period.

13. The residual-current circuit breaker according to claim 1, wherein one output of the second circuit arrangement is connected through circuitry with an input of the first timer and/or of the second timer.

14. The residual-current circuit breaker according to claim 1, wherein one output of the second timer is connected through circuitry with an input of the first timer.

15. A method for operating residual current circuit breaker of claim 1, the method comprising:
    detecting a residual current;
    generating a residual current signal;
    charging an energy storage circuit by the residual current signal;
    comparing the residual current signal substantially simultaneously with a comparison value that represents a tripping residual current; and
    inhibiting tripping of the residual-current circuit breaker for a duration of half a period of a grid frequency of an electrical grid if the residual current is greater than the comparison value.

16. The method according to claim 15, wherein, during a first time period following detection of a residual current, the energy storage component is discharged or an electrical connection between the residual current detector and a rectifier is broken.

17. The method according to claim 16, wherein, during a second time period following the first time period, discharging of the energy storage component or breaking of the electrical connection between the residual current detector and the rectifier is prevented.

* * * * *